Feb. 6, 1968 D. E. WUERFLEIN 3,368,139
SWITCHING MODE SERIES VOLTAGE REGULATOR
Filed Aug. 4, 1964 2 Sheets-Sheet 1
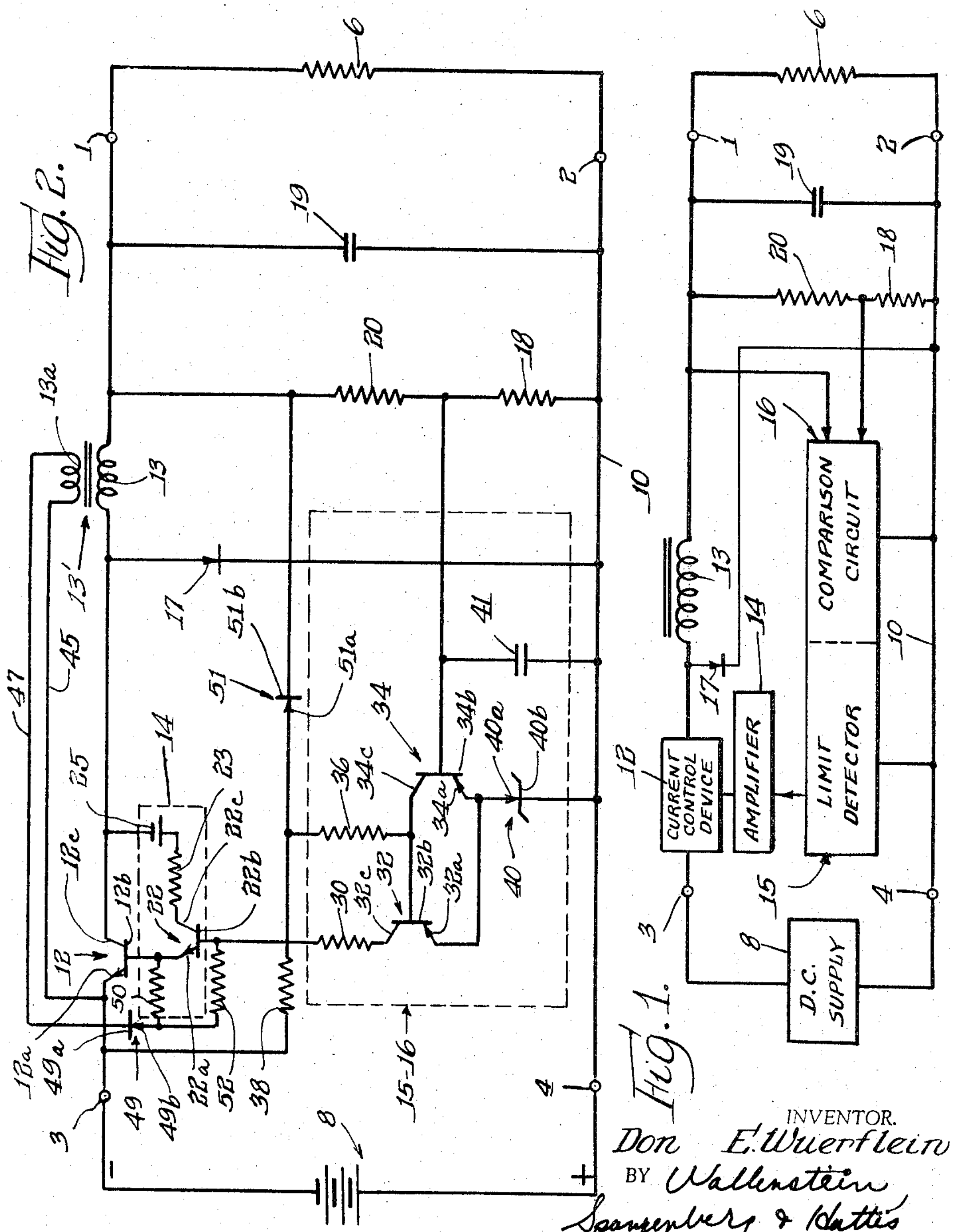

SWITCHING MODE SERIES VOLTAGE REGULATOR
Filed Aug. 4, 1964 2 Sheets-Sheet 2
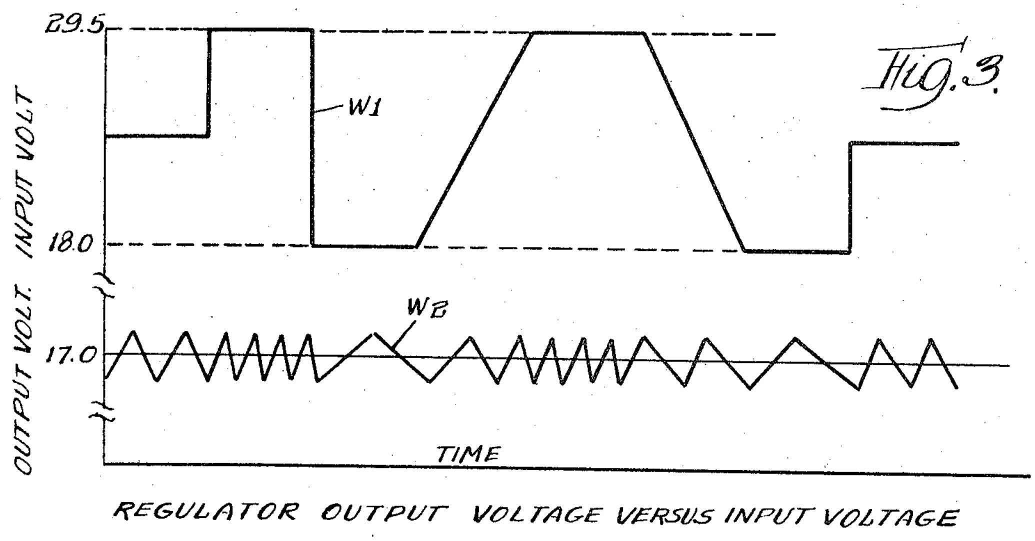
REGULATOR OUTPUT VOLTAGE VERSUS INPUT VOLTAGE
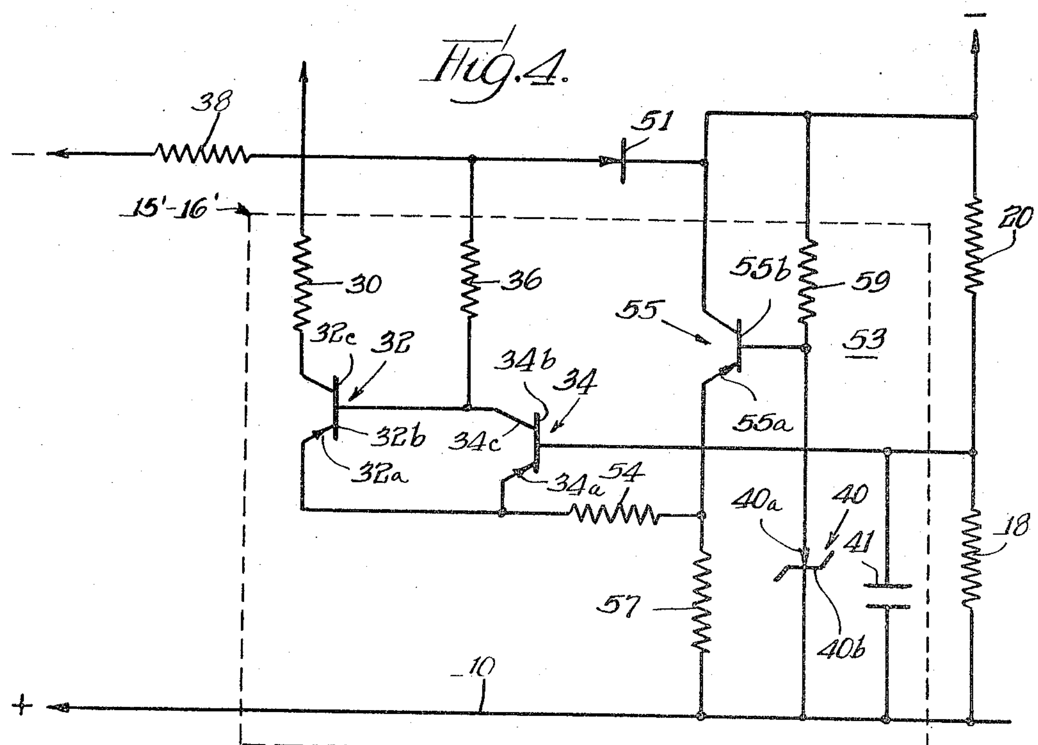
INVENTOR.
Don E. Wuerflein
BY Wallenstein, Spangberg & Hattis
attys.

United States Patent Office 3,368,139

Patented Feb. 6, 1968

3,368,139

SWITCHING MODE SERIES VOLTAGE REGULATOR

Don E. Wuerflein, Gardena, Calif., assignor to Gulton Industries, Inc., Metuchen, N.J., a corporation of New Jersey Filed Aug. 4, 1964, Ser. No. 387,457
6 Claims. (Cl. 323—22)

ABSTRACT OF THE DISCLOSURE

A power transistor connected in series between an input and an output terminal of a series direct current voltage regulator circuit is controlled by a driver transistor having its emitter and collector electrodes connected between the base and collector electrodes of the power transistor, a forward biasing direct current voltage source is connected in series with the emitter and collector electrodes of the driver transistor to oppose the voltage drop across the emitter and collector electrodes of the driver transistor and the base and collector electrodes of the power transistor.

The present invention relates to series direct current (D.C.) voltage regulators, although some aspects thereof have a broader application.

There are two common types of series D.C. voltage regulators. In one type, a current control element is placed in series between a D.C. input terminal and a filter circuit, and the resistance of the current control element is varied in a manner to provide a constant output voltage in the regulator circuit. Although this type of regulator circuit generally has an excellent dynamic response to both input voltage and load variations, it is a very inefficient regulator circuit because appreciable power may be dissipated in the current control element.

The other common type of series regulator circuit (sometimes referred to as a pulse width regulator) uses a current control device which is rendered fully conductive or fully non-conductive. Regulation is achieved by controlling the proportion of the time the current control device is in its conductive state. Circuits of this type usually require an A.C. signal source which establishes a basic repetitive period or cycle during which the current control device is rendered conductive for a proportion of each basic period or cycle necessary to establish a regulated average D.C. output. As is conventional in practically all voltage regulator circuits, an error voltage is obtained determined by the difference between the actual output voltage of the circuit and a reference voltage. In the pulse width regulator, the error voltage is often fed to one or more saturable magnetic amplifier circuits each of which acts as a gate which passes a portion of the alternate half cycles of the A.C. signal depending on the magnitude of the error voltage. The signal passing through each gate renders the current control device conductive for the duration thereof. Although this type of circuit is highly efficient, it suffers from the serious disadvantage that the circuit has a poor dynamic response limited by the frequency of the A.C. signal source so that the regulator cannot react quickly to input or load transients.

The present invention combines the advantages of the high efficiency of the pulse width regulator circuit just described with the fast dynamic response of the series dissipative regulator referred to above. Moreover, this improvement is accomplished with a very simple and inexpensive circuit.

In accordance with one aspect of the present invention, the regulator circuit uses a current control device in series between one of the input terminals of the regulator circuit and a filter circuit, the device being operated in either a fully conductive or a fully non-conductive state preferably by a solid state limit detector circuit. The limit detector circuit is most advantageously a regenerative bistable circuit, such as a Schmitt type bistable circuit, whose state depends on the magnitude of an error voltage determined by the difference between the output voltage of the regulator circuit and a reference voltage. If the error voltage rises above an upper limit, the limit detector bistable circuit will switch to one stable state which will operate the aforementioned current control device in its non-conductive state. This allows the regulator output voltage to decrease at a rate determined by the load conditions. When the error voltage decreases below a lower limit, the limit detector bistable circuit will switch to its other stable state which will operate the aforementioned current control device in its conductive state. The regulator output voltage will then rise at a rate determined by the peak input voltage, the value of the filter circuit parameters and the load current. From the above, it can be seen that the output voltage continually fluctuates between limits determined by the voltage limits at which the limit detector bistable circuit operates between its two states.

The Schmitt type regenerative bistable circuits heretofore developed inherently operate with a very substantial voltage difference (referred to as a hysteresis) between the voltage levels at which the bistable circuits are triggered between their two states. This causes a very substantial regulator output ripple when used in the circuit described above, which is undesirable from a number of viewpoints. Thus, specifications for regulator circuits normally provide limitations in the output ripple. This output ripple can, of course, be reduced by adding another series regulator circuit to the output thereof or by adding additional filter components to the output of the regulator circuit. These approaches have the disadvantage of materially reducing the efficiency and the dynamic response of the circuit. In a very simple and unique manner to be described, a Zener diode is utilized both to establish an error voltage for operating the limit detector bistable circuit and for materially reducing the hysteresis thereof to a point where the output ripple is insignificant.

Another aspect of the invention deals with an efficiency increasing improvement in an amplifier circuit which responds to the limit detector circuit and operates the current control device. It is common to control a power transistor constituting the aforementioned current control device with a driver transistor in what is sometimes referred to as a Darlington circuit. Where the current control device is an NPN transistor, the emitter and collector electrodes of an NPN driver transistor are connected between the base and collector electrodes of the power transistor. Control over the conduction of the power transistor is effected by a drive voltage producing circuit connected to the base electrode of the driver transistor. The disadvantage of the Darlington circuit is that the use of the driver transistor materially increases the voltage drop across the emitter and collector electrodes of the power transistor. For example, instead of a normal voltage drop in the order of .1 to .3 volt the voltage drop across the power transistor becomes as much as 1–1½ volts. In a low voltage circuit, this means that a substantial proportion of the available power is dissipated in the main current carrying transistor, which greatly reduces the efficiency of the circuit. Another aspect of the present invention makes possible with the addition of an inexpensive element the use of a Darlington type circuit with practically no loss in efficiency thereof.

The above and other advantages and features of the invention will become apparent upon making reference to the specification to follow, the claims and the drawings wherein:

FIG. 1 is a basic block diagram of series regulator circuit to which the present invention is applied;

FIG. 2 is an exemplary circuit diagram of one form of the present invention;

FIG. 3 illustrates exemplary input and output voltage waveforms of the circuit of FIGS. 1 and 2; and FIG. 4 illustrates the circuit diagram of an improvement of part of the circuit of FIG. 2.

Referring now to FIG. 1, the series regulator circuit thereshown has a pair of output terminals 1 and 2 at which a regulated voltage is produced from a steady or a widely varying input D.C. voltage applied to input terminals 3 and 4 or under widely varying loads represented by a load resistor 6. The source of the D.C. input voltage to the regulator circuit is indicated in FIG. 1 by reference numeral 8. The input and output terminals 2 and 4 of the regulator circuit are connected by a common conductor 10. A main current carrying current control device 12, which may be a transistor or the like, is connected between the input terminal 3 and an inductance 13 which, among other things, may constitute a portion of a filter circuit including a capacitor 19 connected between the common line 10 and the load side of the inductance 13. A commutating rectifier 17 is coupled between the input side of the inductance 13 and the common conductor 10. The rectifier 17 is arranged to allow the stored energy in the inductance 13 to be applied to the output of the regulator circuit when the power transistor 12 is in its non-conductive state.

The current control device 12 is driven between fully conductive and non-conductive states by signals fed thereto from the output of an amplifier 14. The amplifier 14 has an input coupled to the output of a limit detector circuit 15. The limit detector circuit 15 operates in conjunction with a comparison circuit 16 which compares a voltage from the output of the regulator circuit, such as obtained across a resistor 18 connected in series with a resistor 20 between the common conductor 10 and the load side of the inductance 13. As will appear, the limit detector and comparison circuit form an integrated circuit which utilize as a common element a Zener diode (not shown in FIG. 1) which establishes a fairly stable voltage thereacross. The stable Zener diode voltage is used both for the purpose of establishing an error voltage which is the difference between the Zener diode voltage and that portion of the output voltage coupled to the comparison circuit, and for the purpose of narrowing the limits between which the limit detector operates to reduce the ripple component.

The limit detector 15 acts as a regenerative bistable Schmitt type circuit which is operated in a first state when the voltage coupled to the comparison circuit from the resistor 18 rises to a given value relative to the reference voltage drop across the Zener diode and is operated to a second state when the voltage coupled to the comparison circuit from the resistor 18 drops below a given voltage level relative to the Zener diode voltage. When the limit detector bistable circuit is in its first state, the control signal coupled to the current control device 12 from the amplifier 14 will render the current control device conductive, and when the limit detector bistable circuit is in its second state, the control signal coupled to the current control device 12 from the amplifier 14 will render the same non-conductive.

In FIG. 3, waveform W1 illustrates a widely varying fluctuation of the input D.C. voltage applied to the input terminals 3 and 4 of the regulator circuit and waveform W2 illustrates the fluctuation in the output voltage of the regulator circuit resulting from the input voltage waveform W1 in accordance with the mode of operation of the regulator circuit just described.

Refer now to the exemplary circuit diagram of FIG. 2 which illustrates an exemplary schematic diagram for the circuit illustrated mostly in block form in FIG. 1. As illustrated in FIG. 2, the current control device 12 is a NPN power transistor having an emitter electrode **12*a*, a base electrode 12*b* and a collector electrode 12*c*. (The terminals of the emitter and collector electrodes are sometimes referred to as load terminals and the base electrode is sometimes referred to as a control terminal.) The emitter electrode 12*a* is connected to the input terminal 3 which in turn is connected to the negative terminal of the D.C. supply 8. The collector electrode 12*c* is connected to the input side of the aforementioned inductance 13 which, as illustrated, constitutes the primary winding of a transformer 13' having a secondary winding 13*a*. The secondary winding 13*a* forms part of a feed-back circuit for insuring the quick return of the power transistor 12** to a non-conductive state in a manner to be explained more fully hereinafter.

The amplifier 14 includes an NPN driver transistor 22 having an emitter electrode **22*a* a base electrode 22*b* and a collector electrode 22*c*. The emitter electrode 22*a* is connected to the base electrode 12*b* of the power transistor 12 and the collector electrode 22*c* of the driver transistor 22 is connected to the collector electrode 12*c* of the power transistor 12 through a series circuit including a current-limiting resistor 23 and a forward-biasing battery or cell 25**.

In the absence of the battery 25, the voltage drop between the emitter and collector electrodes of the power transistor 12 is equal to the voltage drop between the emitter and base electrodes of the power transistor 12 plus the voltage drop between the emitter and collector electrodes of the driver transistor 22 and the voltage drop across the current limiting resistor 23. Depending upon the transistor type, this overall voltage drop can be readily in the neighborhood from 1 to 1½ volts and higher which would result in a high percentage power loss in the power transistor 12 for a regulator circuit operating at low voltage levels, such as a voltage of 20 and under. This can be explained in the following way. The driver transistor 22 effectively connects the base electrode **12*b* of the power transistor to the collector electrode 12*c*. Therefore, the power transistor collector voltage cannot go any lower than the drive voltage or it would shunt away its own drive through the collector-emitter junction involved. The emitter to base voltage required to drive a silicon driver transistor sufficiently to drive the power transistor to saturation in a circuit like that now being described is typically from 1 to 1½ volts. Therefore, the emitter to collector voltage of this same transistor cannot be any less than that. It is apparent, therefore, that the sum of the voltage drops between the emitter and the base electrodes of the power transistor 12 and between the emitter to collector electrodes of the driver transistor 22 will be in excess of from 1 to 1½ volts without the addition of the battery 25**.

In accordance with one aspect of the invention, the battery 25 opposes or bucks-out the emitter to base electrode drop of the power transistor 12 and the emitter to collector electrode drop of the driver transistor 22, so that the net voltage drop across the power transistor emitter to collector electrodes can be as low as from $\frac{1}{10}$ to $\frac{3}{10}$ volt.

The base electrode **22*b* of the driver transistor 22 is connected to a resistor 30 forming part of the limit detector bistable circuit 15. The end of the resistor 30 remote from the driver transistor is connected to the collector electrode 32*c* of a PNP transistor 32. The collector electrode 34*c* is connected directly to the base electrode 32*b* of the transistor 32. The collector electrode 34*c* is connected through a resistor 36 and a resistor 38 to the input terminal 3 of the regulator circuit. The base electrode 34*b* of the transistor 34 is connected to the juncture of the resistors 18 and 20** whose opposite ends are respectively connected to the common conductor 10 and the load side of the transformer primary winding 15. Thus, the voltage across the resistor 18 represents a part of the output of the voltage of the regulator circuit which is fed to the limit detector circuit 15.

The transistors 32 and 34 and the associated circuit elements form a Schmitt type trigger circuit, which is, in effect, a regenerative bistable circuit wherein the transistors are in opposite states of conduction and non-conduction at any instant. In the normal Schmitt type trigger circuit, a resistor is connected between the emitter electrodes 32*a* and 34*a* and the common conductor 10. In such a circuit the voltage conditions across the resistor vary widely for the condition when the transistors 32 and 34 are in their conductive states. In such case the limits at which the circuit switches between its two conditions or states are widely separate. This is undesirable in a regulator circuit of the type being described because it increases the magnitude of the output ripple. In accordance with the present invention, a Zener diode 40 (or a Zener diode stabilized voltage as in the embodiment to be described in connection with FIG. 4) is connected between the commonly connected emitter electrodes 32*a* and 34*a* and the common conductor 10. As illustrated, the anode electrode 40*a* of the Zener diode is connected to the emitter electrodes of the transistors 32 and 34 and the cathode electrode 40*b* thereof is connected to the common conductor 10. The Zener diode provides a fairly stable voltage with varying current between the emitter electrodes of the transistors 32 and 34 and the common conductor 10. It serves both as a reference voltage and a means for moving the limits at which the limit detector switches closer together to decrease the output ripple.

A detailed description of the operation of the limit detector bistable circuit in the regulator circuit is as follows: When the voltage coupled to the base electrode of the transistor 34 from the resistor 18 is lower than the Zener diode voltage, the transistor 34 is reverse biased and is rendered non-conductive (assuming that it was previously conductive). With the transistor 34 in a non-conductive state, a negative voltage is coupled by the reisstor 36 to the base electrode 32*b* of the transistor 32 which will render the latter transistor conductive. The resulting current flow in the transistor 32 will also flow through the base to emitter junctions of the driver transistor 22 and the power transistor 12 which are thereby driven to a high conductive state. This will cause a build-up of voltage across the filter capacitor 19 coupled across the output of the voltage regulator circuit.

When the voltage coupled to the base electrode of the transistor from the resistor 18 increases a small amount above the Zener diode voltage, then the non-conductive transistor 34 becomes forward biased which switches the tranisstor to a highly conductive state. When the transistor 34 becomes conductive, it begins to short out the base electrode 32*b* of the transistor 32 which then starts to become non-conductive. When this occurs, the current flowing through the Zener diode is reduced and because the Zener diode has a finite (but small) dynamic impedance, the voltage drop across it decreases slightly. This voltage change is coupled through a capacitor 41 connected between the common conductor 10 and the base electrode 34*b* of the transistor 34 in phase with the input signal. This resultant regeneration speeds up the switch-over of the transistor 34 from its non-conductive to its conductive state. When the transistor 34 has been rendered fully non-conductive, the negative voltage previously coupled to its base electrode 32*b* therefrom and the voltage drop across the Zener diode 40 which is effectively applied to the base and emitter electrode circuit of the transistor 32 will render the latter transistor non-conductive. When the transistor 32 is non-conductive, the drive current for the driver and power transistors 22 and 12 is removed and they are rendered non-conductive.

The speed at which the power and driver transistors 12 and 22 are rendered non-conductive is increased by the feedback circuit of which the secondary winding 13*a* of transformer 13′ forms a part. The feedback circuit includes a conductor 45 connected between one end of the secondary winding 13*a* and the input side of the power transistor 12 and a conductor 47 extending from the other end of the secondary winding 13*a* to the cathode electrode 49*a* of a diode 49. The anode electrode 49*b* of the diode 49 is connected through a current-limiting resistor 50 to the base electrode of the power transistor 12 and through a current-limiting resistor 52 to the base electrode of the driver transistor 22. The connections of the feedback circuit to the secondary winding 13*a* of the transformer 13′ are such that when the power transistor 12 starts to become non-conductive, the resulting decrease in the current flow through the primary winding 13 of the transformer 17 will induce a voltage in the secondary winding 13*a* which will make the conductor 47 negative with respect to the conductor 45. This negative voltage will pass through the diode 49, and when applied to the base electrodes 12*b* and 22*b* of the transistors 12 and 22 will speed-up the transition of the transistors from their conductive to their non-conductive states.

The resistor 38 in conjunction with a diode 51 whose anode electrode 51*a* is connected to the juncture of resistor 36 and 38 and whose cathode electrode 51*b* is connected to the upper or outer end of the resistor 20, forms a start circuit for insuring the operation of the regulator circuit when power is initially applied thereto. The resistor 38 supplies a small forward bias through the resistor 36 to the base electrode 32*b* of the transistor 32 to render the same initially conductive. This will result in a turning on of the transistors 12 and 22 in the manner previously described. The diode 51 isolates the starting current from the resistors 18 and 20 connected across the output of the regulator circuit.

Refer now to FIG. 4 which illustrates an improvement in the combined limit detector and comparison circuit 15–16 just described in connection with FIG. 2. The limit detector and comparison circuit is identified by reference numerals 15′–16′ in FIG. 4. This circuit has a much better output voltage stability with temperature and a higher operating frequency capability than the circuit 15–16 in FIG. 2. These circuits have many elements in common and the common elements therein have been given identical reference numerals so that the relationship between these circuits is readily apparent. It can be seen that the Zener diode 40 has been removed from direct connection with the emitter circuit of the limit detector transistors 32 and 34 and placed in the input of an emitter-follower transistor circuit generally indicated by reference numerals 53. Instead of the Zener diode, a relatively small resistor 54 has been connected directly to the emitter electrode of the transistors 32 and 34 and a resistor 57 constituting the output resistor of the emitter-follower circuit is connected between the resistor 54 and the common conductor 10. The juncture of resistors 54 and 57 is connected to the emitter electrode 55*a* of a transistor 55. Since the effective output impedance of an emitter-follower circuit is extremely low, the resistor 54 is added to the circuit to give the circuit more regeneration to effect faster switching between the different states of the limit detector circuit.

The anode 40*a* of the Zener diode 40 is connected to the base electrode 55*b* of the transistor 55 and the cathode 40*b* thereof is connected to the common conductor 10. A resistor 59 is connected between a base electrode 55*b* and the upper end of a resistor 20. The resistor 59 supplies current to operate the Zener diode 40 since the resistor 59 is connected to the negative output of the regulator.

Most Zener diodes require a fixed current for greatest stability with temperature. In the embodiment of FIG. 2, the limit detector circuit 15 provides a varying Zener diode current with input voltage change, because the resistor 30 therein is effectively across the input and it supplies part of the Zener diode current when the transistor 32 is in a conductive state. Improved temperature stability is also obtained by the circuit of FIG. 4 because the emitter-base voltage drop of the transistor 34 is temperature sensitive and the emitter-base voltage drop of the transistor 55 will drift the same amount so that the net effect on the output will be a zero drift.

As previously indicated, the present invention provides both an extremely high efficiency and extremely fast dynamic response. Also, the theoretical D.C. output impedance of the regulator circuit of the invention is 0 ohm, since the limits of the limit detector are not effected by load current. Also, the alternating current output impedance, for all practical purposes can be 0 ohm with proper choice of filter parameters and limit detector constants.

It should be understood that numerous modifications may be made in the preferred forms of the invention described above without deviating from the broader aspects of the invention.

I claim:

1. In a series voltage regulator circuit including a pair of D.C. input terminals and a pair of output terminals across which a regulated D C. output is to appear, a power transistor having emitter and collector terminals coupled to one of said input terminals and a base terminal, the power transistor being capable of being rapidly rendered conductive or non-conductive, and filter means coupled between the output side of the load terminals of said power transistor for providing a relatively substantially stable voltage at said output terminals from a pulsating D.C. voltage fed thereto varying between some finite value and zero, the improvement comprising a control circuit for driving said power transistor between conductive and non-conductive states to provide at the output side of the load terminals thereof a pulsating D.C. voltage having an average value at or near the desired D.C. output of the regulator circuit, said control circuit comprising: a driver transistor for driving said power transistor between a conductive and a non-conductive state, said driver transistor having load terminals and a control terminal, a source of forward-biasing direct current voltage, said load terminals of said driver transistor and said source of forward-biasing direct current voltage being connected in series between the base terminal and the collector terminal of said power transistor so the load current of said driver transistor supplies the drive current for said power transistor, the polarity of said source of forward-biasing direct current voltage opposing the voltage drop across the load terminals of said driver transistor and reducing the voltage drop across the load terminals of said power transistor during the conduction thereof, and means responsive to the output voltage of the regulator for feeding control signals to the control terminal of said driver transistor to control the relative durations of the conductive and non-conductive states of said power transistor to stabilize the average output of the regulator circuit.

2. In a series type voltage regulator circuit including a pair of D.C. input terminals and a pair of output terminals across which a regulated D.C. output voltage is to appear, a first current control device having load terminals coupled in series with one of said input terminals, said current control device being capable of being rapidly rendered conductive and non-conductive, and filter means coupled between the output side of the load terminals of said current control device and said output terminals for providing a relatively stable voltage at said output terminals from a pulsating D.C. voltage fed thereto varying between some finite value and zero, the improvement comprising: a control circuit for driving said current control device between conductive and non-conductive states, said control circuit comprising a limit detector circuit including second and third current control devices each having a pair of load terminals and a control terminal, one of the load terminals of the second and third current control devices being connected together, and the other load terminal of said second current control device being connected to the control terminal of the third current control device to form a control circuit wherein the pair of current control devices are always in opposite states of conduction and non-conduction, the states thereof being reversed to form a first condition of the control circuit when the resultant voltage between the control terminal and said one load terminal of said second current control device reaches a given voltage level and the states thereof being returned to their original condition constituting a second condition of the control circuit when said resultant voltage drops below a second voltage level below said first voltage level, the difference between said voltage levels constituting the hysteresis of the control circuit, means coupling a D.C. voltage which is a measure of the output of the regulator circuit between the control terminal of said second current control device and a reference point, and voltage stabilizing means coupled between said connected together load terminals of said second and third current control devices and said reference point for stabilizing the voltage thereat independently of whether said second or third current control device is in a conductive state, to reduce the hysteresis of the control circuit said voltage stabilizing means including a Zener diode which provides a substantially constant direct current voltage drop thereacross with varying load current flow therethrough and a direct current reference voltage, and means responsive to said first condition of said control circuit for rendering said first current control device non-conductive and responsive to said second condition of said control circuit for rendering said first current control device conductive.

3. The voltage regulator circuit of claim 2 wherein said Zener diode is connected directly between said commonly connected load terminals of said second and third current control devices and said reference point.

4. The voltage regulator circuit of claim 2 wherein said voltage stabilizing means further includes a fourth current control device having load terminals and a control terminal, an impedance element connected between one of the load terminals of said last mentioned current control device and said reference point to form a follower type circuit where the effective impedance across said impedance element is low and the voltage thereat follows the voltage applied to the control terminal of said fourth current control device, and said Zener diode being connected between the control terminal of said fourth current control device and said reference point, wherein the voltage across said impedance element is substantially independent of the load current flowing in said second and third current control devices.

5. A transistor current control circuit comprising: a power transistor having emitter, collector and base terminals, a driver transistor for driving said power transistor, said driver transistor having emitter, collector and base terminal, a source of forward-biasing direct current voltage, said emitter and collector terminals of said driver transistor and said source of forward-biasing direct current voltage being connected in series between the base and collector terminals of said power transistor so the load current of said driver transistor supplies and said source of forward-biasing direct current voltage aids the drive current for said power transistor, the polarity of said forward-biasing direct current voltage being such that it opposes the voltage drop across the load terminals of said driver transistor and reduces the voltage drop between the base and collector terminals of the power transistor during the conduction thereof.

6. A series voltage regulator circuit including a pair of D.C. input terminals and a pair of output terminals across which a regulated D.C. output is to appear, a current control device having load terminals coupled to one of said input terminals and a control terminal, the current control device being capable of being rapidly rendered conductive or non-conductive, filter means including an inductive winding coupled between the output side of the load terminals of said current control device and said output terminals for providing a relatively substantially stable voltage at said output terminals from a pulsating D.C. voltage fed thereto varying between some finite value and zero, a control circuit having a first condition for driving said current control device to a conductive state and a second condition for driving said current control device to a non-conductive state to provide at the output side of the load terminals thereof a pulsating D.C. voltage having an average value at or near the desired D.C. output of the regulator circuit, means for sensing the output of said current control device, and means responsive to the sudden drop in the output of said current control device for feeding a current reducing signal to the control terminal of said current control device rapidly to render the same non-conductive, said last mentioned means including a second winding inductively coupled to said inductive winding and forming a transformer therewith, a rectifier and conductors coupling said second winding and rectifier to the control terminal of said current control device.

References Cited

UNITED STATES PATENTS

| | | | |
|---|---|---|---|
| 2,767,330 | 10/1956 | Marshall | 323—4 |
| 2,993,127 | 7/1961 | Noll | 323—22 |
| 3,304,489 | 2/1967 | Brolin et al. | 323—9 |
| 2,995,697 | 8/1961 | Grenier | 323—22 |
| 3,022,457 | 2/1962 | Doan | 323—22 |
| 3,158,801 | 11/1964 | Tighe | 323—22 |
| 3,219,912 | 11/1965 | Harrison | 323—22 |
| 3,223,915 | 12/1965 | Ryerson | 321—18 |

OTHER REFERENCES

Halperin and Koblenz, IBM Technical Bulletin, vol. 5, No. 1, June 1962, page 1.

JOHN F. COUCH, *Primary Examiner.*

K. D. MOORE, A. D. PELLINEN, *Assistant Examiners.*